July 23, 1963

W. D. KENNEY ETAL 3,098,530

DISC HARROW

Filed May 15, 1961

INVENTORS:
William D. Kenney
William O. Vernon
BY

ATTORNEY

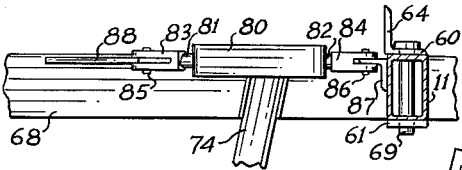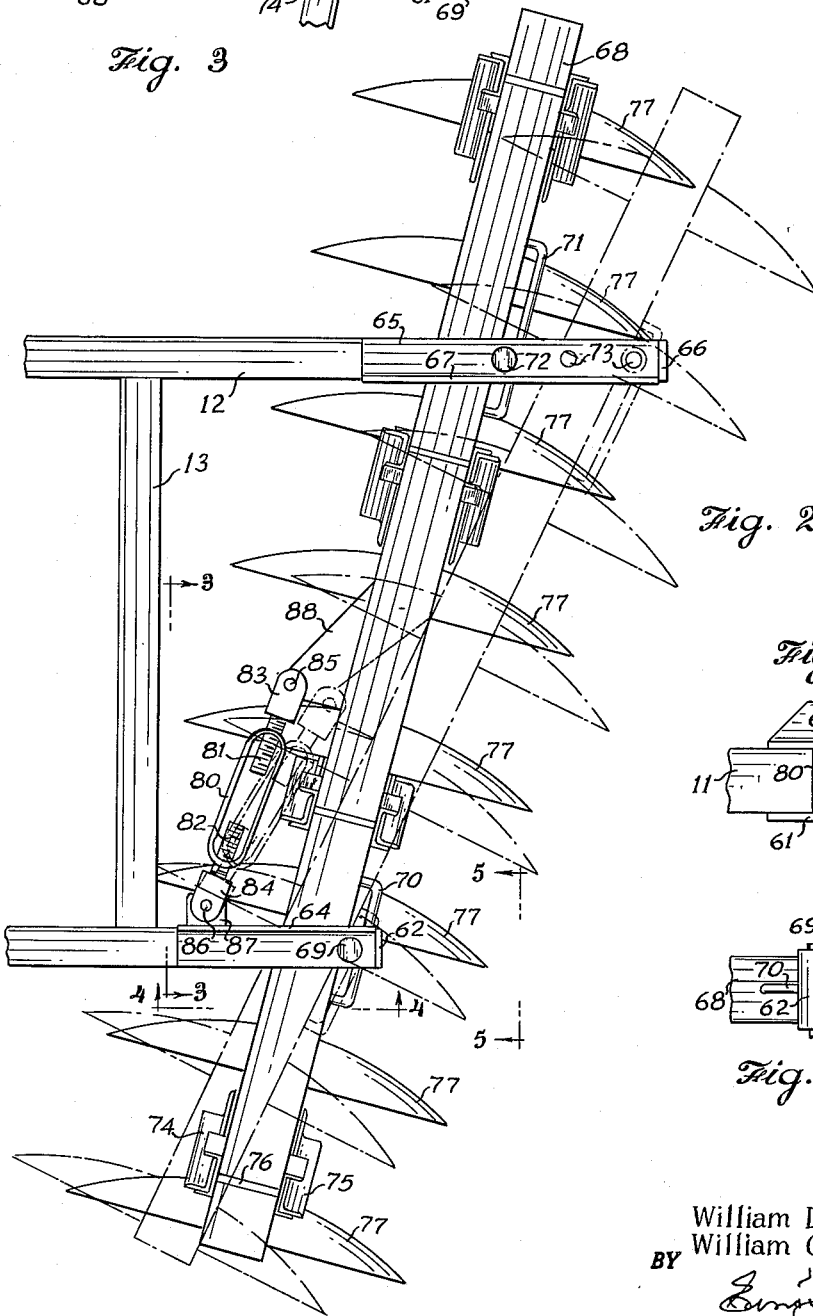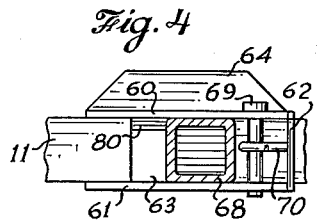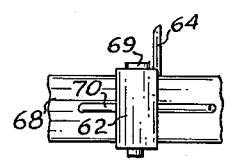
INVENTORS:
William D. Kenney
William O. Vernon
ATTORNEY

United States Patent Office 3,098,530
Patented July 23, 1963

3,098,530
DISC HARROW
William D. Kenney and William O. Vernon, Columbus, Ga., assignors to Columbus Iron Works Company, Columbus, Ga., a corporation of Georgia
Filed May 15, 1961, Ser. No. 110,052
9 Claims. (Cl. 172—591)

This invention relates to a disc harrow and is more particularly concerned with a disc harrow having laterally and angularly adjustable gang assemblies.

In the past many disc harrows have been developed. Such disc harrows have usually been of the tandem type, having front and rear gangs wherein the angular positions of the discs may be varied with respect to the direction of travel of the harrow. Some such harrows have provided for lateral adjustment of the rear blades with respect to the front blades; however, such devices have usually been complicated and expensive and have not been well suited to withstand severe treatment. Thus there has been a long felt need for a simple yet effective disc harrow wherein the discs of one gang may be laterally adjusted with respect to the discs of the other gang.

One of the chief objections to the performance of the offset type disc harrows, in general, is the difficulty and often the impossibility of obtaining an even surface plane of the soil wherein one pass or cut joins and parallels the preceding pass or cut. The ability to produce even, symmetrical furrows or laps during the plowing operation is an important feature often sought for in disc harrows. One requirement for obtaining even lapping by an offset disc harrow is that there be a proper cutting relationship between the rear discs and those of the front over a wide range of cutting angle settings for both the front and rear gangs. This relationship in the past has been partially, but inadequately, achieved in some instances by loosening or removing bolts followed by manually aligning or positioning the rear disc gang assemblies with those of the front and tightening of the bolts. This method requires a great deal of time and effort and is impractical where frequent cutting angle adjustments are required.

Briefly, to obviate the problems described above, we have devised a simple and effective disc harrow which in the present embodiment is an offset disc harrow having a frame with central wheels disposed for rotation about a transverse axis and diametrically adjustable vertically for lifting and lowering the gang assemblies. The front gang assembly is carried by the frame in front of the wheels and the rear gang assembly is carried by the frame behind the wheels. The rear gang assembly includes a transverse gang bar which is slidable and pivotable about a pivot point offset from the axis of the bar, there being provided a linkage assembly between the pivot point and bar, by means of which the lateral position of the bar may be readily varied as desired.

Accordingly, it is an object of the present invention to provide a disc harrow wherein the lateral positions of the front and rear discs may be readily and easily varied with respect to each other.

Another object of the present invention is to provide a disc harow which is easily adjusted to produce a wide variety of cutting conditions.

Another object of the present invention is to provide a disc harrow which is well suited for serving as an offset disc harrow and when used in such capacity will evenly and smoothly work and redistribute the soil.

Another object of the present invention is to produce a disc harrow which is inexpensive to manufacture, durable in structure, and efficient in operation.

Other objects, features and advantages of the present invention will become apparent from the following description when taken in conjunction with the accompanying drawings wherein like characters of reference designate corresponding parts throughout the several views, and wherein:

FIG. 2 is an enlarged fragmentary plan view of the rear portion of the disc harrow shown in FIG. 1, the broken lines therein showing one adjusted position of the rear gang assembly.

FIG. 3 is a cross sectional view taken along line 3—3 in FIG. 2.

FIG. 4 is a cross sectional view taken along line 4—4 in FIG. 2.

FIG. 5 is a cross sectional view taken along line 5—5 in FIG. 2.

Figure 1:
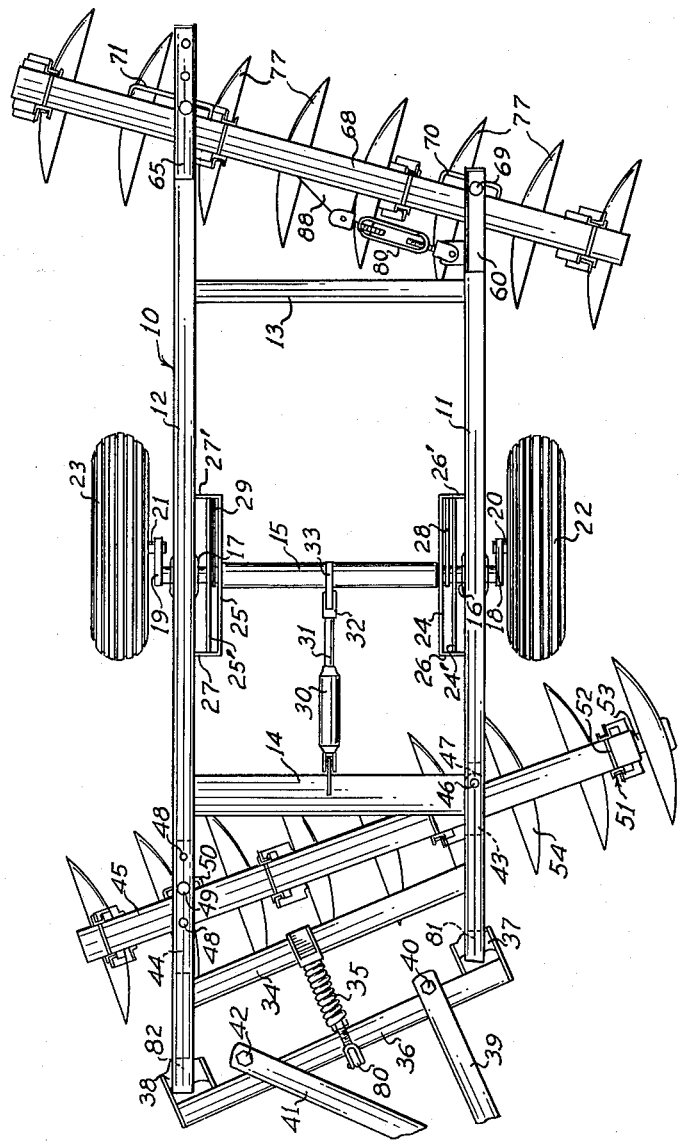
FIG. 1 is a plan view of a disc harrow constructed in accordance with the present invention.

Referring now in detail to the embodiment chosen for the purpose of illustrating one concept of the present invention, it being understood that the present invention in its broader aspects is not limited to the exact details herein depicted, the offset disc harrow here disclosed includes a frame 10 particularly adapted for towing behind a tractor. The frame 10 comprises a pair of opposed spaced longitudinal frame members or side bars 11 and 12 connected at intermediate portions by a pair of spaced, parallel transverse struts 13 and 14 and an angular disposed strut 34. Preferably the side bars 11 and 12 and the struts 13 and 34 are tubular members rectangular, e.g. square, in cross sections while strut 14 is tubular round reinforced by a flat rectangular bar. Welding or other means is employed for joining ends of struts 13, 14 and 34 to the inner sides of side bars 11 and 12 so that the side bars are held rigidly, parallel to each other in a horizontal plane and protrude in front of and behind struts 13, 14 and 34.

It will be observed in FIG. 1 that outer side bar 12 is substantially longer than inner side bar 11 and therefore protrudes both in front of and behind the inner side bar 11 for purposes to be described hereinafter.

In the central part of frame 10 between and parallel to struts 13 and 14 is a transverse axle 15, the ends of which are of reduced diameter and protrude through journals 16 and 17 which are connected below side bars 11 and 12, respectively, in the manner illustrated in U.S. Patent No. 2,857,724. The outer ends of the axle 15 are provided with aligned radially and rearwardly extending torsion arms 18 and 19 provided at their outer ends with outwardly protruding, transversely aligned stub shafts 20 and 21. Stub shafts 20 and 21 which are thus offset from and parallel to the axle 15 receive for rotation thereon the wheels 22 and 23 respectively. It is now seen that upon rotation of axle 15, the wheels 22 and 23 will be moved in an arcuate path so that they may be raised and lowered with respect to the flange 10.

For locking the axle in predetermined radial positions, there are provided pairs of parallel longitudinally disposed quadrant bars 24, 24' and 25, 25' above axle 15 provided throughout their length with pin receiving holes (not shown). The quadrant bars 24, 24' are supported by their ends by means of spaced brackets 26, 26' which extend inwardly from the side bar 11. Likewise, complementary brackets 27, 27' support from the side bar 12 the quadrant bars 25, 25'. Connected to and extending radially from the axles 15 for movement between quadrant bars 24, 24', 25, 25' are a pair of locking levers 29 and 28 by means of which the wheels 22 and 23 may be selectively positioned in various positions of vertical adjustment as explained more fully in U.S. Patent No. 2,857,724.

Pivotally connected to a central portion of strut 14 is a double acting hydraulic cylinder 30 provided with a piston (not shown) which operates a piston rod 31, the piston rod 31 being provided at its end with a clevis 32. The clevis 32 is pivotally connected to the end of a radially extending lever 33 rigidly connected to the central portion of axle 15. Thus, upon actuation of the cylinder 30 by hydraulic fluid from the tractor's hydraulic system, the axle 15 will be rotated in one direction or the other. With the piston rod 31 extended as shown in FIG. 1, the wheels 22 and 23 will be lowered so that the harrow may be pulled over the ground by the tractor with no blades or discs engaging the ground. The wheels 22 and 23 may be locked in such a position by locking levers 28 and 29 or in any intermediate position. With the piston retracted, the wheels 22 and 23 will be lifted, being rotated rearwardly and upwardly, so that the wheels 22 and 23 no longer engage the ground, but instead the harrow rests upon its blades as will be described hereinafter.

Spaced in front of the strut 14 is an angularly facing hitch assembly including a spring supporting bar 34 arranged at an angle of about 30° from this transverse strut 14. The ends of bar 34 are connected to side bars 11 and 12 with the rear or inner end of bar 34 being connected to bar 11. One end of a heavy adjustable compression type coil spring 35 is supported against a bracket fastened to the top of strut 34 and through which slides back and forth a round rod as the spring is compressed and released by rotating movement of tow bar 36. The rod extends through the center of the spring coils frontward on which end it has a clevis by which it is journally connected by a pin to the upstanding lever 80. Behind the clevis the spring rod is screw threaded and has installed on it a nut and flat faced washer against which is the other end of the coil compression spring. The turning of this nut on the rod will either compress or release the spring to vary the force on the rear gang disc. Over the rod behind the bracket on strut 34 is a slidable adjustable stop collar which adjusts the amount of rotating movement of the tow bar 36 by the spring 35 when the harrow is supported by the wheels. In so doing this stop collar holds the front end down and the rear end up in transport when on the wheels. The other end of upstanding lever 80 is fixed at the midportion of a tow bar 36 which extends parallel to bar 34 and between and below the ends of the side bars 11 and 12. The ends of tow bar 36 are provided with U-shaped relatively wide yokes 37 and 38, the arms of which are relatively wide and vertically disposed. The central portions of yokes 37 and 38 are flat, horizontal plates which are received in open ended horizontal slots (not shown) adjacent the lower ends of downwardly extending brackets 81 and 82 carried by the ends of bars 11 and 12. Thus, the yokes permit appreciable axial movement of bar 36 while the spring 35 urges tow bar 36 away from bar 34.

Between the yoke 37 and spring 35, one end of a tongue or towing strut 39 is pivotally secured by means of bolt 40 to tow bar 36. This tongue 39 extends normal to the bar 36 forwardly for towing engagement with the tractor. A stabilizer bar 41 pivotally connected to tow bar 36 by bolt 42 extends forwardly at a greater angle than tongue 39 and is telescopically adjustable in length as its other end is fastened to the forward portion of the tongue 39 to angularly adjust the forward end of the tongue 39 in a horizontal plane across the width of the spaced parallel members 11 and 12.

In the offset harrow there is a tendency, since the front and rear gangs angle in diverging directions, to be rotated in a counterclockwise direction as viewed in FIG. 1. The purpose of the angling hitch or draft arrangement, e.g. the tongue 39, is to resist such rotation and provide a pull which will offset this rotational tendency.

Between the strut 14 and bar 36, the side bar 12 is provided with horizontal slots 44 formed either by cutting out the vertical sides of the bars 11 and 12 or by cutting the bars and welding horizontal plates to connect the upper and lower surfaces thereof. Below the bar 14, a similar but smaller slot 43 is provided in side bar 11, the slot 43 being slightly rearward of slot 44. Received within the slots 43 and 44 is the transversely angling front gang bar 45 which protrudes outwardly of both side bars 11 and 12, the end of gang bar 45 adjacent bar 12 being forward of the end adjacent bar 11. It will be observed in FIG. 1 that the front gang bar is about parallel to bar 34 and normal to tongue 39, a projection of tongue 39 about intersecting the midportion of gang bar 45. A pivot pin 46 which passes through plates on bar 11 and slot 43 projects through a rearwardly extending bracket 47 on the rear side of bar 45. Thus, the bar 45 is adapted to pivot about pin 46 within the confines of the relatively wide slot 44 of bar 12.

The upper and lower portions of bar 12 which define slot 44 are provided with spaced, vertically aligned holes 48 through which a removable pin 49 is adapted selectively to project. For cooperating with pin 49, the gang bar 45 is provided with a rearwardly extending U-shaped strap 50. When the gang bar 45 is arranged at a proper angle with respect to the side bars 11 and 12, the pin 49 is inserted in the appropriate one of holes 48 and thus passes between strap 50 and bar 45.

On the gang bar 45 is a gang assembly including a plurality of axially spaced downwardly extending brackets 51, each pair sandwiching bar 45 and being retained in place by bolts 52 which pass above and below the bar 45. The lower ends of brackets 51 retain an arbor bolt or disc shaft 53 in place parallel to and spaced below gang bar 45. The shaft 53 is about in the plane of tongue 39. On shaft 53 are a plurality of evenly spaced concaved outwardly and slightly forwardly facing discs or blades 54 which tend to work the ground outwardly as the blades 54 are carried forwardly by the frame.

At the rear end of the frame 10 is the rear gang. For supporting the rear gang, the ends of side bars 11 and 12 are provided with opposed plates which form opposed closed slots. As best seen in FIG. 4, a pair of flat parallel upper and lower plates 60 and 61 are secured, respectively, to the upper and lower surfaces of side bar 11 at its rear end, as by welding or the like. The plates 60 and 61 protrude rearwardly beyond the end of side bar 11 and their ends are joined by an end cap 62 so as to define a closed horizontal transverse slot 63. The upper plate 60 is provided with an upstanding flange 64 to provide rigidity.

Similarly, upper and lower plates, such as plate 65, are provided on the end of side member 12, the ends of the plates being joined by end cap 66 to provide a closed horizontal transverse slot (not shown) which is substantially longer and rearwardly of slot 63. Plate 65 is reinforced by upstanding flange 67.

Received within the slots thus formed, such as slot 63, is a rear gang bar 68, which as seen in FIG. 4 is a rectangular, e.g. square, tubular member similar to gang bar 45. The gang bar 68 protrudes outwardly beyond side bars 11 and 12 and is adapted to be about parallel to the path of the forward or front gang bar 45 when the harrow is pulled along the ground.

For retaining the rear gang bar 68 in place in slot 63, a pin 69 passes through aligned holes in the rear portion of plates 60 and 61, passing through a closed loop formed by a U-shaped flat strap 70 the width of bar 68, the ends of strap 70 being secured to the back side of gang bar 68. The strap 70 is relatively long between bends and, therefore, the gang bar 68 may be moved laterally or in a transverse direction by the distance of the loop thus formed. A similar strap 71 is provided on the rear side of gang bar 68 between the plates such as plate 65. This strap 71 defines a longer loop than the loop of strap 70 and is adapted to receive in the loop a pin 72 which selectively protrudes through any pair of a plurality of vertically aligned holes 73 in the plates, such as plate 65. It is therefore seen that the angle between gang bar 68 and side bars 11 and 12 may be varied as shown by full lines and broken lines in FIG. 2, the gang bar pivoting about pin 69 to its adjusted position.

Gang bar 68 is provided with a gang assembly comprising a plurality of spaced downwardly extending pairs of brackets 74, 75, the upper ends of which sandwich the gang bar 68 and are held in place by bolts 76. The lower ends of the opposed pairs of brackets 74 and 75 retain a shaft (not shown) in parallel relationship below gang bar 68, the shaft being provided with a plurality of evenly spaced concaved discs or blades 77 in concentric relationship.

For positively and progressively moving the gang bar 68 in a lateral direction, i.e. moving gang bar axially or along its main axis, there is provided a turnbuckle which includes a central body member 80 having opposed aligned holes at opposite ends, the holes having left hand and right hand internal threads which threadedly receive the axially aligned studs 81 and 82. The outer ends of studs 81 and 82 which protrude beyond body member 80 are provided with clevises 83 and 84 which retain vertically disposed pins 85 and 86. An inwardly protruding flange 87, extending from the inner rear end portion of side bar 11, is received between the arms of clevis 84 and receives bolt 86 therethrough. A central, forwardly extending, triangular shaped flange 88 which is secured to the front central portion of gang bar 68 receives bolt 85 of clevis 83. It will be seen, therefore, that the turnbuckle is about parallel to the rear gang bar 68 and so positioned by flanges 87 and 88 a distance from bar 68 that as the bar 68 is adjusted forward or backward through the aperture formed by the plates on the rear end of member 12 and is pivoted about pin 69, it also is shifted laterally the optimum amount to compensate for the relative change in angle of the rear blades to the front and thereby retain the desirable cutting relationship. Normal manipulation of the body member 80 moves the bar 68 and its gang members laterally, incrementally, i.e. infinitely additional amounts so that blades 77 may have a number of desired aligned working relationships with blades 54 of the forward gang.

From the foregoing description the operation of the present invention is apparent. The harrow, which in the present embodiment is an offset harrow, is connected in the usual way by means of the tongue 39 to the tractor. The hydraulic lines (not shown) to the cylinder 30 are then connected to the tractor and, by the appropriate pumping of hydraulic fluid, the wheels 22 and 23 are raised and lowered as desired. When the tractor is transporting the harrow to and from a particular field, the wheels 22 and 23 are preferably lowered, thereby lifting the blades 54 and 77 from engagement with the ground and permitting the harrow to ride entirely on wheels 22 and 23, being stabilized by its hitch to the tractor.

When, however, it is desired to utilize the harrow, the angles of the front gang bar 45 and the rear gang bar 68 are adjusted as desired by first removing pins 49 and 72 and then positioning the gang bars 45 and 68 to their respective predetermined positions such that the respective loops formed by the U-shaped straps 50 and 71 align with the selected holes 48 and 73. Thereafter, the pins 49 and 72 are reinserted in appropriate holes 48 and 73. If it is desired to move the rear gang blades 77 laterally, the body member 80 is rotated in the appropriate direction, which axially moves the rear gang bar 68 within the limits defined by strap 70 and pin 69.

Thereafter, the hydraulic cylinder 30 is operated to lift wheels 22 and 23 and permit the gangs of blades 54 and 77 to engage the ground. The wheels may be locked in position as desired by means of locking levers 28 and 29. The tractor is then operated to pull the harrow over the ground.

When moved across the ground, the front blades 54 produce parallel valleys and ridges, longitudinally. The width of the unplowed ridges produced by the front gang will vary with the angle of the blades 54, the size of the blades 54, the spacing of the blades 54 and the depth of their penetration into the ground. It is desirable that the rear blades 77 cut out the ridges left between the front blades 54. In addition, the soil of the ridge cut by, for example, the leftmost rear blade 77, must be moved sufficient to lap over that of the previous pass and blend the two into a smooth continuous unridged surface plane. The frequent adjustment of the angle of cut of the blades 77 may be necessary.

If, with the rear gang bar angle at its smallest, represented by full lines in FIG. 2, the leading edge of the blades 77 were centered properly for one cutting position and the gang bar 68 were pivoted to increase the cutting angle of blades 77, the blades in addition to moving in an arc would automatically move a distance laterally maintaining a cutting relationship with front blades 54. Additional lateral movement often is desired at each setting of pin 72 which is obtained by rotating body member 80.

It will be obvious to those skilled in the art that many variations may be made in the embodiments chosen for the purpose of illustrating the present invention without departing from the scope thereof as defined by the appended claims.

We claim:

1. In a disc harrow of the type having a frame which is moved over the ground and a gang assembly carried by the frame and comprising a movable gang bar having disc blades mounted thereon for engagement with the ground, the combination therewith of a turnbuckle connected between said gang bar and said frame for varying the axial position of said gang bar on said frame, and a pivot pin positioned on said frame adjacent said turnbuckle about which said gang bar may be pivoted in a horizontal plane.

2. In a disc harrow of the type having a frame which is moved over the ground and a gang assembly carried by the frame and comprising a movable gang bar having disc blades mounted thereon for engagement with the ground, the combination therewith of a turnbuckle connected between said gang bar and said frame for varying the axial position of said gang bar on said frame, a pivot pin positioned on said frame adjacent said turnbuckle about which said gang bar may be pivoted, said turnbuckle being arranged about parallel to said gang bar with one end of said turnbuckle connected to about the midportion of said gang bar, and means remote from said turnbuckle for selectively fixing the horizontal angular position of said gang bar with respect to said frame in various predetermined angular positions.

3. In a disc harrow of the type having a frame carrying angularly adjustable front and rear gang bars which carry disc blades mounted thereon for engagement with the ground over which said frame moves, the combination with one of said gang bars of a turnbuckle arranged about parallel thereto with one end of said turnbuckle connected to said one of said gang bars and the other end connected to said frame, and pivot means for said one of said gang bars about a vertical axis, said pivot means being positioned on said frame adjacent the connection of said turnbuckle to said frame, said turnbuckle being constructed and arranged for moving said one of said gang bars in an axial direction upon manipulation of said turnbuckle.

4. In a disc harrow of the type having a frame carrying diverging angularly adjustable front and rear gang bars which carry disc blades mounted thereon for engagement with the ground over which said frame moves, the combination with one of said gang bars of a turnbuckle arranged about parallel thereto with one end of said turnbuckle connected to said one of said gang bars and the other end connected to said frame, pivot means for said one of said gang bars about a vertical axis, said pivot means being positioned on said frame adjacent the connection of said turnbuckle to said frame, said turnbuckle being constructed and arranged for moving said one of said gang bars in an axial direction upon manipulation of said turnbuckle, and a tongue connected to the front of said frame for connecting said frame to a tractor, said tongue angling from said frame and being so constructed and arranged as to be about normal to said front gang bar.

5. In a disc harrow, an inner side bar, an outer side bar spaced from and extending parallel to said inner side bar, struts joining said side bars to provide a frame, a front gang bar supported by said side bars in a transverse angling position, the end of said gang bar adjacent said outer side bar being forward of the other end thereof, disc blades carried by said front gang bar for engagement with the ground over which said frame is moved, a rear gang bar carried at the rear end portion of said side bars in a transverse angling position diverging with respect to said front gang bar, disc blades mounted on said rear gang bar for engagement with the ground over which said frame passes, means for varying the angle of said rear gang bar, and means for varying the axial position of said rear gang bar on said frame, said last mentioned means including a turnbuckle arranged about parallel to said rear gang bar.

6. A disc harrow comprising an inner side bar, an outer side bar spaced from and extending parallel to said inner side bar, struts joining said side bars to provide a frame, wheel means centrally of said frame by means of which said frame may be transported over the ground, a front gang bar supported by said side bars in a transverse angling position in front of said wheel means, the end of said gang bar adjacent said outer side bar being forward of the other end thereof, means for varying the angle of said front gang bar, disc blades carried by said front gang bar for engagement with the ground over which said frame is moved, a rear gang bar carried by the rear ends of said side bars in a transverse angling position diverging with respect to said front gang bar, disc blades carried by said rear gang bar for engagement with the ground over which said frame passes, means for varying the angle of said rear gang bar, and means for varying the axial position of one of said gang bars on said frame, said last mentioned means including a turnbuckle arranged about parallel to said one of said gang bars, one end of one shaft of said turnbuckle being pivotally connected to said one of said gang bars between said side bars, the end of the other shaft of said turnbuckle being pivotally connected to said inner side bar, and a pivot pin carried by said inner side bar adjacent the connection of said turnbuckle to said inner side bar, said one of said gang bars slidably engaging said pin.

7. A disc harrow comprising an inner side bar, an outer side bar spaced from and extending parallel to said inner side bar, struts joining said side bars to provide a frame, a front gang bar supported by said side bars in a transverse angling position, the end of said gang bar adjacent said outer side bar being forward of the other end thereof, means for varying the angle of said front gang bar, disc blades carried by said front gang bar for engagement with the ground over which said frame is moved, a rear gang bar carried by the rear end portion of said side bars in a transverse angling position diverging with respect to said front gang bar, disc blades carried by said rear gang bar for engagement with the ground over which said frame passes, means for varying the angle of said rear gang bar, and means for varying the axial position of said rear gang bar on said frame, said last mentioned means including a turnbuckle arranged about parallel to said rear gang bar, one end of one shaft of said turnbuckle being pivotally connected to said rear gang bar between said side bars, the end of the other shaft of said turnbuckle being pivotally connected to said inner side bar, and a pivot pin carried by said inner side bar adjacent the connection of said turnbuckle to said inner side bar, said rear gang bar slidably engaging said pin.

8. A disc harrow comprising an inner side bar, an outer side bar spaced from and extending parallel to said inner side bar, struts joining said side bars to provide a frame, said outer side bar extending in front of and behind said inner side bar, wheel means centrally of said frame by means of which said frame may be transported over the ground, a tow bar angling between the end portions of said side bars, a tongue extending from said tow bar for engagement with a tractor, a front gang bar supported by said side bars in a transverse angling position in front of said wheel means, the end of said gang bar adjacent said outer side bar being forward of the other end thereof, means for varying the angle of said front gang bar, evenly spaced disc blades carried by said front gang bar for engagement with the ground over which said frame is moved, said tongue being about normal to said front bar and being so positioned on said frame as to about bisect said front bar, a rear gang bar carried by the rear ends of said side bars in a transverse angling position diverging with respect to said front gang bar, evenly spaced disc blades carried by said rear gang bar for engagement with the ground over which said frame passes, means for varying the angle of said rear gang bar, and means for varying the axial position of said rear gang bar on said frame, said last mentioned means including a turnbuckle arranged about parallel to said rear gang bar, one end of one shaft of said turnbuckle being pivotally connected to about the midportion of said rear gang bar between said side bars, the end of the other shaft of said turnbuckle being pivotally connected to said inner side bar, and a pivot pin carried by said inner side bar adjacent the connection of said turnbuckle to said inner side bar, said rear gang bar slidably engaging said pin.

9. In a disc harrow of the type having a frame movable over the ground in a longitudinal direction, front and rear gang assemblies mounted on said frame, said gang assemblies each including blades engageable with the ground for creating parallel valleys and ridges longitudinally parallel to the direction of movement of said frame when said frame is moved over the ground and means for varying the angular position of said rear gang assembly with respect to said frame, the combination therewith of means for adjusting said rear gang assembly laterally of said frame for moving said blades of said rear gang assembly into positions for cutting out the ridges produced by said blades of said front gang assembly, said last mentioned means including threaded means arranged parallel to said rear gang assembly, one portion of said threaded means being associated with said frame and another portion of said threaded means being associated with said rear gang assembly, said threaded means being so constructed and arranged that relative rotation of a portion of said threaded means with respect to the other portion thereof varies the effective length of said threaded means to thereby vary proportionally the lateral position of said rear gang assembly, one portion of said threaded means being connected to said frame adjacent said means for varying the angular position of said rear gang assembly, the other portion of said threaded means being connected to the central portion of said rear gang assembly within the confines of said frame.

References Cited in the file of this patent
UNITED STATES PATENTS

| | | |
|---|---|---|
| 696,808 | Gatling | Apr. 1, 1902 |
| 2,529,039 | Meyer | Nov. 7, 1950 |
| 2,952,325 | Toland | Sept. 13, 1960 |